(12) United States Patent
Benkert et al.

(10) Patent No.: US 9,660,257 B2
(45) Date of Patent: May 23, 2017

(54) STORAGE ELEMENT

(75) Inventors: Katrin Benkert, Schwaig (DE);
Carsten Schuh, Baldham (DE);
Thomas Soller, Landau/Isar (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 422 days.

(21) Appl. No.: 14/345,236

(22) PCT Filed: Sep. 3, 2012

(86) PCT No.: PCT/EP2012/067130
§ 371 (c)(1),
(2), (4) Date: Mar. 15, 2014

(87) PCT Pub. No.: WO2013/045217
PCT Pub. Date: Apr. 4, 2013

(65) Prior Publication Data
US 2014/0342217 A1    Nov. 20, 2014

(30) Foreign Application Priority Data
Sep. 27, 2011    (DE) .................. 10 2011 083 541

(51) Int. Cl.
| | | |
|---|---|---|
| H01M 12/08 | (2006.01) |
| H01M 10/39 | (2006.01) |
| H01M 4/131 | (2010.01) |
| H01M 4/38 | (2006.01) |
| H01M 4/52 | (2010.01) |
| H01M 4/80 | (2006.01) |
| H01M 10/0562 | (2010.01) |
| H01M 4/02 | (2006.01) |

(52) U.S. Cl.
CPC ............ *H01M 4/131* (2013.01); *H01M 4/38* (2013.01); *H01M 4/523* (2013.01); *H01M 4/801* (2013.01); *H01M 4/803* (2013.01); *H01M 10/0562* (2013.01); *H01M 10/39* (2013.01); *H01M 12/08* (2013.01); *H01M 2004/021* (2013.01); *H01M 2300/0077* (2013.01)

(58) Field of Classification Search
None
See application file for complete search history.

(56) References Cited

U.S. PATENT DOCUMENTS

| | | |
|---|---|---|
| 2,627,531 A | 2/1953 | Vogt |
| 5,217,822 A | 6/1993 | Yoshida et al. |
| 2005/0042490 A1 | 2/2005 | Finnerty |
| 2006/0204830 A1 | 9/2006 | Ovshinsky et al. |
| 2010/0266925 A1 | 10/2010 | Hori |
| 2011/0033769 A1 | 2/2011 | Huang et al. |
| 2013/0034784 A1 | 2/2013 | Landes et al. |
| 2013/0153408 A1 | 6/2013 | Ramm et al. |
| 2013/0189606 A1 | 7/2013 | Ruettinger et al. |

FOREIGN PATENT DOCUMENTS

| | | |
|---|---|---|
| CN | 1226090 A | 8/1999 |
| DE | 4129553 A1 | 3/1992 |
| EP | 1513214 A1 | 3/2005 |
| JP | 2005336022 A | 12/2005 |
| JP | 2006172946 A | 6/2006 |
| JP | 2013502039 A | 1/2013 |
| JP | 2013506049 A | 2/2013 |
| JP | 2013511799 A | 4/2013 |
| JP | 2013513910 A | 4/2013 |
| WO | 2008023805 A1 | 2/2008 |
| WO | 2009082032 A1 | 7/2009 |

*Primary Examiner* — Jonathan Crepeau
(74) *Attorney, Agent, or Firm* — Beusse Wolter Sanks & Maire

(57) ABSTRACT

A storage element for a solid-electrolyte battery is provided, having a main body which is composed of a porous matrix of sintered ceramic particles, and also having a redox system which is composed of a first metal and/or at least one oxide of the first metal, wherein a basic composition of the storage element comprises at least one further oxide from the group comprising $Y_2O_3$, $MgO$, $Gd_2O_3$, $WO_3$, $ZnO$, $MnO$ which is suitable for forming an oxidic mixed phase with the first metal and/or the at least one oxide of the first metal.

15 Claims, No Drawings

STORAGE ELEMENT

CROSS REFERENCE TO RELATED APPLICATIONS

This application is the US National Stage of International Application No. PCT/EP2012/067130 filed Sep. 3, 2012, and claims the benefit thereof. The International Application claims the benefit of German Application No. DE 102011083541.5 filed Sep. 27, 2011. All of the applications are incorporated by reference herein in their entirety.

FIELD OF INVENTION

The invention relates to a storage element for a solid electrolyte battery.

BACKGROUND OF INVENTION

Solid electrolyte batteries are based on the principle of solid electrolyte fuel cells which are expanded by addition of storage elements to the battery. These storage elements usually comprise ceramic main elements in which particles of a metal and/or a metal oxide which together form a redox pair are embedded. In the charged state of the battery, the particles are reduced to the metal. Energy can be obtained by means of atmospheric oxygen and be taken off as electric energy at the tapping poles of the batteries. When the metal particles are completely oxidized to the respective metal oxide, the battery is discharged. In order to recharge the battery, the fuel cell is then operated in the electrolysis mode, forming hydrogen which reduces the metal oxides back to the metal.

The discharging process, i.e. the oxidation of the metal particles into solid, is based predominantly on cationic diffusion. During the discharging process, there is therefore gradual migration of the metal of the metal particles in the direction of the oxygen source, since diffusion of the metal species occurs preferentially over the diffusion of the oxygen species. This leads to a continuous degradation of the storage structure and thus to a gradual change in the charging and discharging characteristics, to an increase in the charging and discharging times required and also to a decrease in the useful capacity.

Furthermore, the cationic diffusion leads to nonoptimal reaction kinetics of the redox process, since oxygen transport is inhibited in the center of the storage particles or layers.

SUMMARY OF INVENTION

It is therefore an object to provide a storage element which has an improved life and more favorable reaction kinetics.

This object is achieved by a storage element having the features described herein.

Such a storage element for a solid electrolyte battery comprises a main element composed of a porous matrix of sintered ceramic particles and a redox system composed of a first metal and/or at least one oxide of the first metal. According to the invention, a base composition of the storage element comprises at least one further oxide from the group consisting of $Y_2O_3$, MgO, $Gd_2O_3$, $WO_3$, ZnO, MnO which is suitable for forming an oxidic mixed phase with the first metal and/or the at least one oxide of the first metal.

In the discharging process of a solid electrolyte battery having such a storage element, the oxidizing metal of the redox system can thus react with these oxide compounds to form a new phase and thus be bound to the structure of the main element. This counters the mass flow of the metal of the redox system in the direction of the oxygen gradient resulting from cationic diffusion. This makes it possible to ensure that the structure of the storage element is substantially maintained even during a long period of operation. In particular, demixing of the store is avoided, so that a large active surface area of the redox system is available even during prolonged operation. In this way, rapid degradation of the storage quality is avoided. The reaction kinetics of the redox process are also improved, so that, overall, stable charging and discharging kinetics are obtained together with a useful capacity which is high over the long term.

In a preferred embodiment, the first metal and/or the at least one oxide of the first metal is embedded in the form of particles in the matrix of the main element. In this case, it is advantageous for the at least one further oxide also to be embedded in the form of particles of the at least one further oxide and/or the oxidic mixed phase in the matrix of the main element. In other words, the matrix of the main element in this embodiment comprises three components, namely ceramic particles, particles of the redox system and particles of the further oxide or the oxidic mixed phase to which the oxidizing metal of the redox system is bound during operation of the storage element.

Such a storage element is particularly simple to produce since all participating components can, for example, be processed in the form of powder mixtures to form slips and shaped to give appropriate ceramics.

In order to achieve optimal storage capacity and at the same time good accessibility for oxygen ions, it is advantageous for the particles of the first metal and/or the at least one oxide of the first metal to make up a proportion by volume of more than 50% by volume of the main element. The particles of the at least one further oxide phase or the oxidic mixed phase then make up a proportion by volume of less than 50% by volume of the main element. It is also advantageous for the main element to have a proportion of pores of 50% by volume in order to aid diffusion. The remainder of the main element then comprises the ceramic matrix.

In an alternative embodiment of the invention, the first metal and/or the at least one oxide of the first metal is embedded in the form of particles which additionally contain the at least one further oxide and/or the oxidic mixed phase in the matrix of the main element. The redox system is thus not present as pure metal and/or pure metal oxide in the storage element, but is itself a constituent of a metal-rich oxide compound. Metal diffusion in the direction of the oxygen source during the discharging process can thus be avoided virtually completely since the metal is kept in the oxidic mixed phase. A further advantage of this embodiment is that a higher volumetric metal content than in binary metal oxides can, if desired, also be achieved.

In this case, the particles which additionally contain the at least one further oxide and/or the oxidic mixed phase make up a proportion by volume of more than 50% by volume of the main element. Here too, a proportion of pores of less than 50% of the main element is advantageous. Apart from the particles which contain both the redox system and also the further oxide or the oxidic mixed phase, only ceramic particles and pores are thus present in such a storage element.

In both embodiments, a large number of oxidic compounds of at least one main group metal and/or transition group metal are suitable for the ceramic matrix. It is particularly advantageous to use $(Y,Sc,Zr)O_2$—, $(Gd,Ce)O_2$—, $Al_2O_3$—, MgO—, $TiO_2$— or $(La,Sr,Ca,Ce)(Fe,Ti,Cr,Ga,Co)O_3$-based materials. Such materials are inert toward redox processes under customary operating conditions of a solid electrolyte battery and do not undergo any appreciable reactions with most redox systems which are advantageously used and are preferably implemented as iron/iron oxide systems.

There are a number of possibilities for the structural configuration of the storage element. Firstly, the at least one further oxide and/or the oxidic mixed phase can be homogeneously distributed in the main element of the storage element. However, a particularly advantageous structure of the storage element is achieved by means of an inhomogeneous distribution.

It is particularly advantageous for the at least one further oxide and/or the oxidic mixed phase to be arranged in the form of barrier layers in the main element, between which layers which are at least predominantly free of the at least one further oxide and/or oxidic mixed phase are located. Such barrier layers form particularly efficient diffusion barriers for the metal ions of the redox system and are therefore preferably arranged in such a way that their normals to the plane point in the direction of the oxygen gradient.

As an alternative thereto, the at least one further oxide and/or the oxidic mixed phase can also form a support skeleton, in particular in the form of a microstructure penetrating all through, within the main element in order to provide a particularly large contact area for the reaction with ions of the metal. Of course, other composites such as arrays of rods or the like are also possible.

DETAILED DESCRIPTION OF INVENTION

Embodiments are illustrated below with the aid of working examples.

To achieve efficient energy storage, new types of rechargeable solid electrolyte batteries having ceramic main elements derived from a solid oxide fuel cell, for example a zirconium dioxide electrolyte layer, and also oxide ceramics as cathode and anode are being developed at present. Metal/metal oxide pairs such as $Fe/Fe_xO_y$ or $Ni/NiO$ preferably serve as central redox elements for this purpose. There is the fundamental problem of very effectively exploiting the theoretical storage capacities and achieving largely constant discharging characteristics in potentiostatic or galvanostatic operation. The long-term stability also has to be ensured both under charging-discharging cycling and in standby operation.

Known storage materials display distinct degradation of the store over time in charging-discharging cycles, which is attributable to separation of iron from the matrix material, for example zirconium oxide. The demixing of the storage structure is attributable to migration of the cationic iron in the direction of the oxygen source during the oxidation process and leads to disadvantageous sintering or agglomerate formation of the storage material and thus to a continuous decrease in the storage capacity.

In order to overcome this problem, iron diffusion in the direction of the oxygen source is prevented by binding the iron to a complex iron compound. The use of $Y_3Fe_5O_{12}$, $Fe_xMg_{1-x}O$, $Gd_3Fe_5O_{12}$, $Fe_2WO_6$, $(Zn,Fe^{2+})WO_4$, $(Zn,Mn^{2+},Fe^{2+})(Fe^{3+},Mn^{3+})_2O_4$ is particularly advantageous for this purpose.

Two variants of binding the iron are possible here.

The storage element can, in one variant, comprise the redox-active storage material S, i.e. iron/iron oxide, a ceramic matrix material M and an oxide compound O which can react with the storage material S to form one of the abovementioned complex oxide phases and is configured as a skeleton structure. During the discharging process, i.e. during the course of the oxidation process, mass flow of the storage material S occurring in the direction of the oxygen gradient is countered by the oxide of iron reacting with the oxide compounds O to form a new phase and thus being bound to the skeleton structure.

The storage structure in this case comprises a redox-active storage material S having a proportion by volume $X_S$ of more than 50% by volume, an oxide compound having a proportion by volume $x_O$ of less than 50% by volume, a proportion of pores $x_P$ of less than 50% by volume and optionally one or more ceramic matrix materials M having a proportion by volume of $x_m = 100 - x_S - x_O - x_P$.

In the case of an iron-based store, S is one or more optionally doped oxide-dispersion-strengthened iron oxides such as FeO, $Fe_3O_4$, $Fe_2O_3$ and/or metallic iron. As oxide compound, use is made of either one of the abovementioned compositions, which may likewise be doped or ODS-modified, or individual oxides from among the compounds listed, for example $Y_2O_3$, MgO, $Gd_2O_3$, $WO_3$, ZnO or MnO. As ceramic matrix material, it is possible to employ all oxidic compounds of the main group metals and transition group metals, in particular $(Y,Sc,Zr)O_2$—, $(Gd,Ce)O_2$—, $Al_2O_3$—, MgO—$TiO_2$— and $(La,Sr,Ca,Ce)(Fe,Ti,Cr,Ga,Co)O_3$-based materials As an alternative thereto, the redox-active storage material $S_O$ can be present not as iron oxide and/or metallic iron in the storage element but instead as fundamental constituent of an iron-rich oxide compound of the abovementioned type. Here too, no iron diffusion in the direction of the oxygen source occurs during the discharging process since the iron remains attached to the oxide compound. A further advantage of this variant is that a higher volumetric iron content than in binary iron oxides can sometimes be achieved.

In this case, the storage structure comprises the redox-active storage material $S_O$, having a proportion by volume $x_S$ of more than 0% by volume, a proportion of pores $x_P$ of less than 50% by volume and optionally one or more ceramic matrix materials M having a proportion by volume $x_M = 100 - x_{SO} - x_P$. In the specific case of an iron-based store, $S_O$ is one of the following compounds: $Y_3Fe_5O_{12}$, $Fe_xMg_{1-x}O$, $Fe_2O_3 + Gd_3Fe_5O_{12}$, $Fe_2O_3 + Fe_2WO_6$, $(Zn,Fe^{2+})WO_4$, $(Zn,Mn^{2+}, Fe^{2+})(Fe^{3+}, Mn^{3+})_2O_4$. Here too, compounds suitable for the ceramic matrix materials are all oxidic compounds of the main group metals and the transition group metals, in particular likewise the abovementioned materials groups.

In both the working examples described, the necessary iron compounds can be prepared by conventional mixed oxide routes, but also by precursor processes, wet-chemical processes and PVD/CVD processes.

The constituents S, O and M or $S_O$ and M can be present either isotropically or in aligned or gradated form in the storage structure. Multilayer structures in which barrier layers composed of the oxide compound O are incorporated, or else structures in which the oxide compound O and/or the ceramic matrix M form a support skeleton, are particularly advantageous.

Further processing of these materials to form the storage element can conceivably be carried out via all conventional ceramic processes, for example pressing, screen printing, tape casting, slip casting, spray processes, electrophoretic deposition and the like. A thermal after-treatment by means of sintering can also be carried out using the materials mentioned.

In the examples mentioned, the main cause of store degradation, namely the migration of the redox-active species in the direction of the oxide source caused by the discharging process and the associated loss of specific surface area by the driven sintering of the storage particles is countered by binding of the iron to the oxide composition during charging. The composites described can have a variety of structural forms, for example as powder mixture, multilayer structures and/or skeleton structures and the like, and allow reproducible, flexible and inexpensive mass production of the storage medium. Apart from the iron/iron oxide-based stores described, it goes without saying that the working examples can be applied to various metal storage materials, oxidic binding partners and ceramic matrices. In addition, higher volumetric than in the binary compounds can advantageously be realized.

The invention claimed is:

1. A storage element for a solid electrolyte battery, comprising
   a main element composed of a porous matrix of sintered ceramic particles and a redox system composed of a first metal and/or at least one oxide of the first metal, wherein
   a base composition of the storage element comprises at least one further oxide from the group consisting of $Y_2O_3$, MgO, $Gd_2O_3$, $WO_3$, ZnO, and MnO which is suitable for forming an oxidic mixed phase with the first metal and/or the at least one oxide of the first metal, and wherein the at least one further oxide and/or the oxidic mixed phase are/is distributed inhomogeneously in the main element of the storage element.

2. The storage element as claimed in claim 1, wherein the first metal and/or the at least one oxide of the first metal is embedded in the form of particles in the matrix of the main element.

3. The storage element as claimed in claim 2, wherein the at least one further oxide is embedded in the form of particles of the at least one further oxide and/or the oxidic mixed phase in the matrix of the main element.

4. The storage element as claimed in claim 2, wherein the particles of the first metal and/or the at least one oxide of the first metal make up a proportion by volume of more than 50% by volume of the main element.

5. The storage element as claimed in claim 3, wherein the particles of the at least one further oxide and/or the oxidic mixed phase make up a proportion by volume of less than 50% by volume of the main element.

6. The storage element as claimed in claim 2, wherein the main element has a proportion of pores of less than 50% by volume.

7. The storage element as claimed in claim 1, wherein the first metal and/or the at least one oxide of the first metal is embedded in the form of particles which additionally contain at least one further oxide and/or the oxidic mixed phase in the matrix of the main element.

8. The storage element as claimed in claim 7, wherein the particles which additionally contain the at least one further oxide and/or the oxidic mixed phase make up a proportion by volume of more than 50% by volume of the main element.

9. The storage element as claimed in claim 7, wherein the main element has a proportion of pores of less than 50% by volume.

10. The storage element as claimed in claim 1, wherein the ceramic matrix comprises an oxidic compound of at least one main group metal and/or transition group metal, wherein the oxidic compound consists of a $(Y,Sc,Zr)O_2$, $(Gd,Ce)O_2$, $Al_2O_3$, MgO, $TiO_2$ or $(La,Sr,Ca,Ce)$—$(Fe,Ti,Cr,Ga,Co)O_3$-based material.

11. The storage element as claimed in claim 1, wherein the at least one further oxide and/or the oxidic mixed phase forms a support skeleton in the form of a microstructure penetrating all through, within the main element.

12. A storage element for a solid electrolyte battery, comprising
    a main element composed of
    a porous matrix of sintered ceramic particles, the ceramic matrix comprising an oxidic compound of at least one main group metal and/or transition group metal, and
    a redox system composed of a first metal and/or at least one oxide of the first metal, wherein
    a base composition of the storage element comprises at least one further oxide from the group consisting of $Y_2O_3$, MgO, $Gd_2O_3$, $WO_3$, ZnO, and MnO which is suitable for forming an oxidic mixed phase with the first metal and/or the at least one oxide of the first metal, and wherein
    the at least one further oxide and/or the oxidic mixed phase is/are arranged in the form of barrier layers in the main element, between which layers which are at least predominantly free of the at least one further oxide and/or the oxidic mixed phase are located.

13. The storage element as claimed in claim 12, wherein the at least one further oxide and/or the oxidic mixed phase forms a support skeleton.

14. The storage element as claimed in claim 12, wherein the particles of the first metal and/or the at least one oxide of the first metal make up a proportion by volume of more than 50% by volume of the main element.

15. The storage element as claimed in claim 12, wherein the at least one further oxide is embedded in the form of particles of the at least one further oxide and/or the oxidic mixed phase in the matrix of the main element, and wherein the particles of the at least one further oxide and/or the oxidic mixed phase make up a proportion by volume of less than 50% by volume of the main element.

* * * * *